(12) United States Patent
Lu et al.

(10) Patent No.: US 11,621,439 B2
(45) Date of Patent: Apr. 4, 2023

(54) CATHODE FOR ALKALINE EARTH AIR BATTERIES

(71) Applicant: UChicago Argonne, LLC, Chicago, IL (US)

(72) Inventors: Jun Lu, Naperville, IL (US); Khalil Amine, Oakbrook, IL (US); Yuanyuan Guo, Westmont, IL (US); Xiaoqiao Zeng, Naperville, IL (US); Xuanxuan Bi, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 176 days.

(21) Appl. No.: 16/856,302

(22) Filed: Apr. 23, 2020

(65) Prior Publication Data
US 2021/0098828 A1    Apr. 1, 2021

Related U.S. Application Data

(60) Provisional application No. 62/906,785, filed on Sep. 27, 2019.

(51) Int. Cl.
| | | |
|---|---|---|
| *H01M 10/0569* | (2010.01) | |
| *H01M 10/052* | (2010.01) | |
| *H01M 12/08* | (2006.01) | |
| *H01M 4/86* | (2006.01) | |
| *H01M 4/96* | (2006.01) | |
| *H01M 4/88* | (2006.01) | |

(52) U.S. Cl.
CPC ..... *H01M 10/0569* (2013.01); *H01M 4/8605* (2013.01); *H01M 4/8807* (2013.01); *H01M 4/96* (2013.01); *H01M 10/052* (2013.01); *H01M 12/08* (2013.01)

(58) Field of Classification Search
CPC .......... H01M 4/86–4/98; H01M 12/00–12/085
See application file for complete search history.

(56) References Cited

U.S. PATENT DOCUMENTS

2019/0252689 A1*  8/2019  Xu ..................... H01M 4/96
2021/0013547 A1*  1/2021  Bi ...................... H01M 4/381

FOREIGN PATENT DOCUMENTS

| EP | 3171436 | * | 5/2017 |
|---|---|---|---|
| EP | 3188306 | * | 7/2017 |

* cited by examiner

*Primary Examiner* — Jonathan Crepeau
(74) *Attorney, Agent, or Firm* — Foley & Lardner LLP

(57) ABSTRACT

An electrochemical device includes an air cathode comprising a SEI (solid electrolyte interphase) layer on a carbon support.

18 Claims, 19 Drawing Sheets

FIG. 1A
FIG. 1B
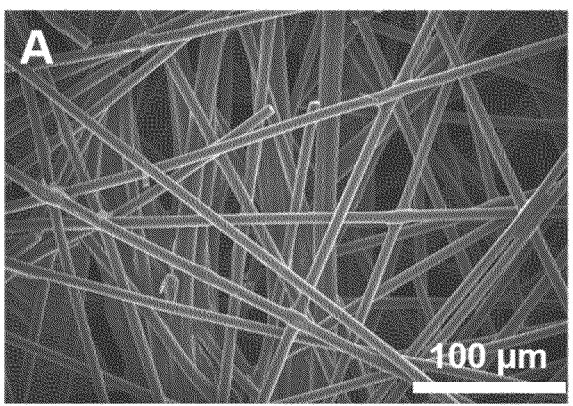
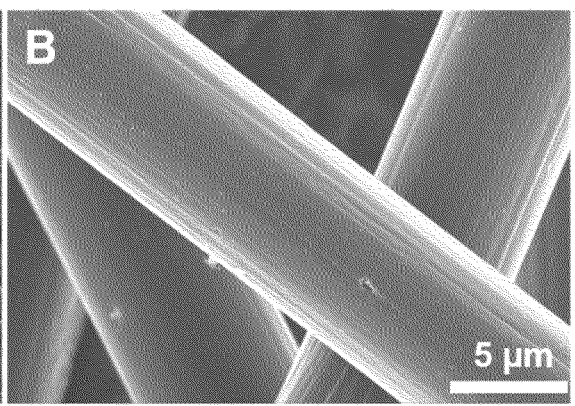
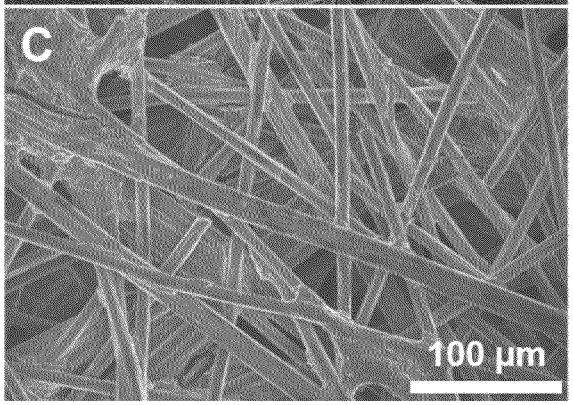
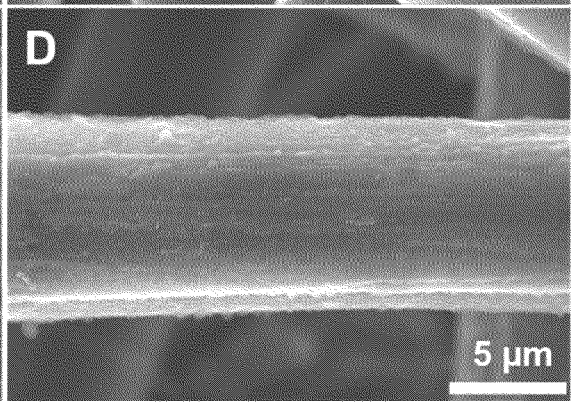
FIG. 1C
FIG. 1D

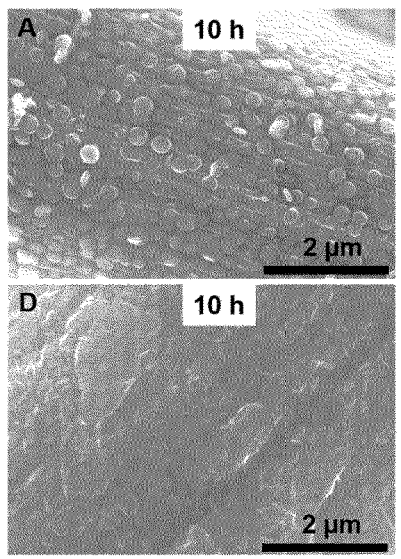
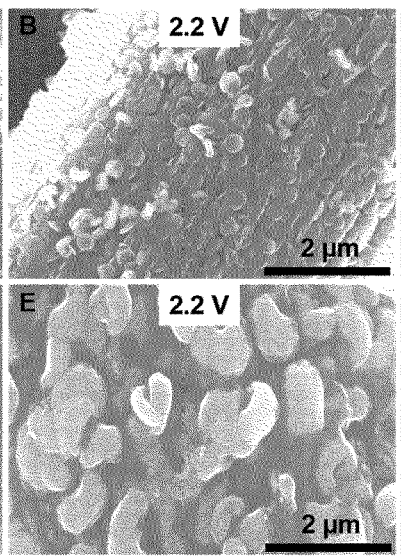
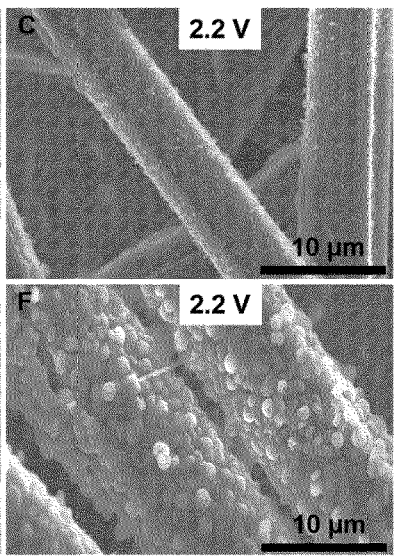
FIG. 7A　　　　　　FIG. 7B　　　　　　FIG. 7C
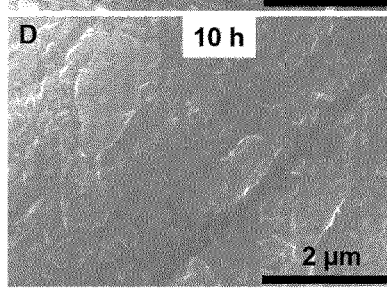
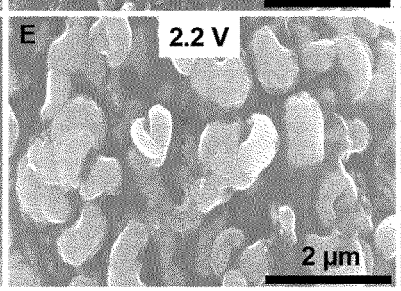
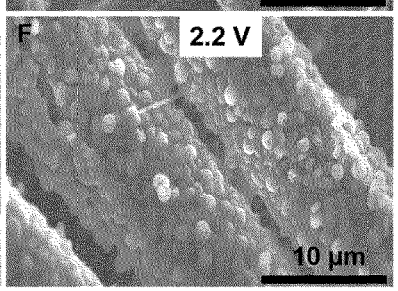
FIG. 7D　　　　　　FIG. 7E　　　　　　FIG. 7F

CATHODE FOR ALKALINE EARTH AIR BATTERIES

CROSS-REFERENCE TO RELATED APPLICATIONS

This application claims the benefit of priority to U.S. Provisional Patent Application No. 62/906,785, filed on Sep. 7, 2019, and which is incorporated herein by reference in its entirety for any and all purposes.

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries containing such electroactive materials, and methods to prepare the electroactive materials and batteries containing the same. More specifically, the present technology is generally related to air cathode batteries.

BACKGROUND

Lithium-oxygen batteries are a promising battery technology for providing high energy density storage. A porous air electrode with high catalytic activity toward oxygen evolution is important in the reversible $2Li^+ + O_2 + 2e^- \leftrightarrow Li_2O_2$ conversion due to the high activation energy for the decomposition of $Li_2O_2$. Traditional air electrodes include a porous, carbon fiber paper support to provide an $O_2$ gas diffusion network, along with a catalyst (for example, noble metals or metal oxides) to lower the charge overpotential. Traditional air electrodes, in many cases, also include a polymer binder to adhere electrode materials to the underlying support material.

In traditional air electrodes, the catalyst is critical to rate performance, cyclability, and efficiency of the lithium-oxygen battery. However, catalyst loading raises concerns including material and processing costs, low areal energy density due to the limited active sites, and pore clogging due to non-uniform material distribution.

SUMMARY

In one aspect, an electrochemical device is provided including an air cathode having a solid electrolyte interphase (SEI) on a carbon support; a metal-containing anode; a porous separator; and an electrolyte that includes an aprotic solvent. In the devices, the SEI may include organic and inorganic domains, wherein the organic domains include polyolefins, lithium alkoxides, sodium alkoxides, or a mixture of any two or more thereof, and wherein the inorganic domains include $Na_2O$, $Na_2O_2$, NaOH, NaF, $Na_2CO_3$, $NaHCO_3$, $Na_2S$, $Li_2O$, $Li_2O_2$, LiOH, LiF, $Li_2CO_3$, $LiHCO_3$, $Li_3N$, $Li_2S$, oligomeric borates, glass borates, or a mixture of any two or more thereof. The electrochemical devices may, in any embodiments, also include a lithium or sodium salt. In some embodiments, the metal-containing anode includes a lithium or sodium metal foil.

In another aspect, a method of making an air cathode is provided and includes discharging an electrochemical device having an air cathode that includes a carbon support, a metal-containing anode, a porous separator, and an electrolyte including a salt and an aprotic solvent to form a solid electrolyte interphase (SEI) on the carbon support. In some embodiments, the discharging is conducted under an argon atmosphere. In any of the above embodiments, the SEI may include organic and inorganic domains, wherein the organic domains include polyolefins, lithium alkoxides, sodium alkoxides, or a mixture thereof, and wherein the inorganic domains include $Na_2O$, $Na_2O_2$, NaOH, NaF, $Na_2CO_3$, $NaHCO_3$, $Na_2S$, $Li_2O$, $Li_2O_2$, LiOH, LiF, $Li_2CO_3$, $LiHCO_3$, $Li_3N$, $Li_2S$, oligomeric and glass borates, or a mixture of any two or more thereof. In some embodiments, the salt is a lithium or sodium. Such salts may include lithium trifluoromethanesulfonate, sodium trifluoromethanesulfonate, or a mixture thereof, and the solvent may include tetraethylene glycol dimethyl ether. In some embodiments, the metal-containing anode includes a lithium or sodium metal foil.

BRIEF DESCRIPTION OF THE DRAWINGS

FIGS. 1A, 1B, 1C, and 1D are scanning electron microscope (SEM) images of pristine carbon fiber paper (FIGS. 1A and 1B) and lithiated carbon fiber paper (FIGS. 1C and 1D), according to the examples.

FIGS. 7A-7F are SEM images of the discharge product of a non-lithiated carbon fiber paper cathode after discharging for 10 hours (FIG. 7A), after discharging to 2.2 V in a lithium-oxygen battery (FIGS. 7B and 7D, at different magnifications), the discharge product of lithiated carbon fiber paper after discharging for 10 h (FIG. 7D), and after discharging to 2.2 V in a lithium-oxygen battery (FIGS. 7E and 7F, at different magnifications), according to the examples.

11A) and SEI coated carbon fiber paper (FIG. 11B) at a current of 50 µA·cm$^{-2}$, according to the examples. The sodium oxygen batteries are operated in high purity $O_2$ atmosphere.

Figure 12A:
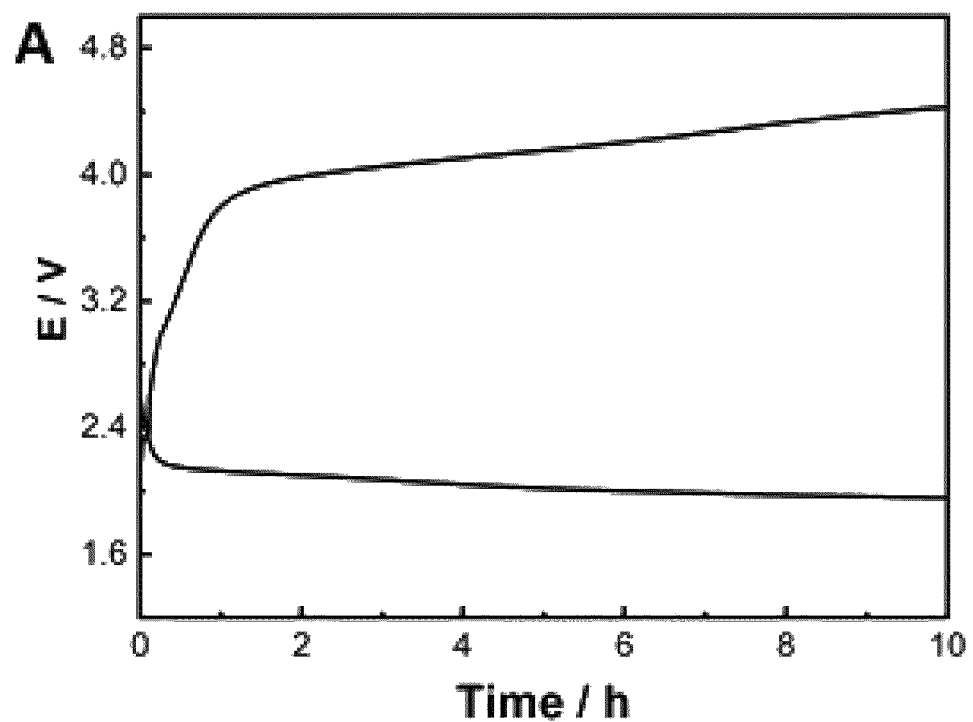
Figure 12B:
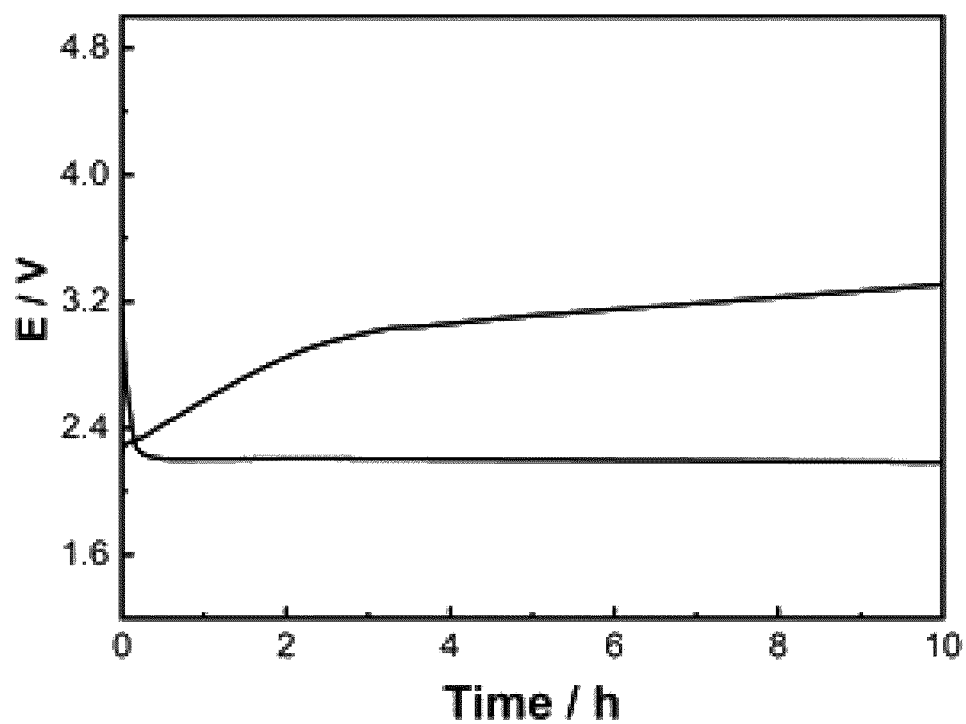

FIGS. 12A and 12B are the voltage profiles of sodium air batteries based on pristine carbon fiber paper (FIG. 12A) and SEI coated carbon fiber paper (FIG. 12B), according to the examples, at a current of 50 µA·cm$^{-2}$, according to the examples. The sodium air batteries are operated in air atmosphere.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

"Oxygen evolution reaction" (OER), as used herein, refers to the process of generating molecular oxygen ($O_2$) by a chemical reaction. In some embodiments, OER refers to the reaction $Li_2O_2 \rightarrow 2Li^+ + O_2 + 2e^-$. In other embodiments, OER refers to the reaction $Na_2O_2 \rightarrow 2Na^+ + O_2 + 2e^-$, $Na_2O_2 \cdot 2H_2O \rightarrow 2Na^+ + O_2 + 2e^- + 2H_2O$, or $NaO_2 \rightarrow Na^+ + O_2 + e^-$.

"Carbonate" or "carbonates," as used herein, refers to a salt of carbonic acid ($H_2CO_3$), characterized by the presence of the carbonate ion, a polyatomic ion with the formula of $CO_3^{2-}$, or to the carbonate ion itself "Carbonate" may also refer to a carbonate ester, an organic compound containing the carbonate group $C(=O)(O-R^1)_2$, wherein $R^1$ is an optionally substituted alkyl group. The carbonate esters may be linear (i.e. ethyl methyl carbonate and the like) or cyclic carbonates (i.e. ethylene carbonate, propylene carbonate, and the like). "Free of carbonates" may refer to a mixture or solvent which is completely free of carbonates or contains less than about 0.1 mol %, less than about 0.01 mol %, less than about 0.001 mol %, or less than about 0.0001 mol % of carbonates.

Air electrodes disclosed herein include a SEI (solid electrolyte interphase) layer on carbon support, such as a carbon fiber paper. The all-in-one air electrodes provide for oxygen/air batteries that exhibit a low charge over-potential. A commercial carbon fiber paper is used as the air electrode, thus eliminating the use of any binder or additional catalyst. A uniform and continuous layer of the solid-electrolyte interface (SEI) is deposited onto the carbon fiber paper by discharging the cell in an argon atmosphere. This in-situ grown SEI layer is provides for improvements in areal energy and power density without requiring additional materials or complex processes during the following discharge-charge cycles of $O_2$. The SEI layer may also be separately deposited on to the carbon paper in a pre-assembly fabrication of the cathode, followed by battery assembly with the SEI layer-modified paper.

An air electrode is a porous carbon fiber paper support that provides a gas diffusion network for oxygen in the air to penetrate into and throughout the cell. Typical devices include catalysts, such as noble metals and metal oxides, to lower the charge over-potential. Electrochemical catalysts are used to improve rate performance, cyclability, and the efficiency of devices. However, loading catalysts in the cells inevitably leads to concerns including material and processing costs, low areal energy density due to the limited active sites, and pore clogging due to non-uniform distribution. The present disclosure solves these problems through employment of a SEI (solid electrolyte interphase) layer on the carbon support as an all-in-one air electrode that can enable a low charge potential lithium oxygen battery.

Provided herein are lithium oxygen or sodium oxygen/air electrochemical devices, and methods of making the same. The electrochemical devices include an air cathode having a solid-electrolyte interface (SEI) layer on a carbon electrode. The air cathodes improve areal energy and power density in batteries, and assists with $O_2$ reduction at the cathode. The SEI layer is formed on the carbon electrode via the initial discharge of the device under argon. The SEI-covered electrode can then function in further discharge cycles without any further processing of the device. The air electrodes having with high catalytic activity in achieving the reversible reactions including $2Li + O_2 \leftrightarrow Li_2O_2$, $2Na + O_2 \leftrightarrow Na_2O_2$, $2Na + O_2 + 2H_2O \leftrightarrow Na_2O_2 \cdot 2H_2O$, or $Na + O_2 \leftrightarrow NaO_2$, due to the high-energy activation energy for the decomposition of the products.

The electrochemical devices include an air cathode having a solid electrolyte interphase (SEI) on a carbon support; an anode comprising a metal; a porous separator; and an electrolyte comprising an aprotic solvent. In some embodiments, the porous separator may be a porous fiber separator. In some embodiments, the metal-containing anode includes a lithium or sodium metal foil. Illustrative electrochemical devices include, but are not limited to, rechargeable batteries such as lithium-air, sodium-air batteries, potassium-air, or magnesium-air batteries.

To form the air cathodes described herein, a carbon support is employed as the air electrode directly, eliminating the use of binder or additional catalyst. A uniform, continuous layer of SEI is deposited on the carbon paper by discharging the device before filling it with oxygen gas. This in-situ grown SEI layer improves areal energy and power density without any additional materials or complex processes.

In some embodiments, the over-potential of a battery employing the SEI enabled porous cathode is about 0.2 V-0.7 V with enhanced cyclability. In comparison, traditional porous carbon cathodes (i.e., carbon with a metallic/ non-metallic catalyst) exhibit a significantly larger overpotential of about 0.8 V-1.5 V. Without being bound by theory, it is believed that the SEI layer stabilizes the formation of peroxide product, while acting as a catalyst for the OER (oxygen evolution reaction) in the metal-air battery. In some embodiments, the air cathode may further include a catalyst such as, but not limited to, Pt, Pd, Au, Ru, Ir, Ag, PtNi, PtAu, PtCu, PtRu, PtPd, $MnO_2$, NiO, $Co_3O_4$, redox mediators, or a combination of any two or more thereof. In some embodiments, the catalyst includes $Pt_3Ni/C$. In some embodiments, the air cathode does not include any of these catalysts.

In one aspect, an electrochemical device is provided, the device including an air cathode having a solid electrolyte interphase (SEI) on a carbon support; a metal-containing anode material; a porous separator; and an electrolyte including an aprotic solvent and a conducting salt. In another aspect, a metal-air battery is provided, including the electrochemical device of any embodiment herein. In some embodiments, the electrochemical devices are primary batteries, secondary batteries, or capacitors.

In another aspect, a method of making an air cathode including a solid electrolyte interphase on a carbon support is provided. The method includes discharging or charging an electrochemical device of an air cathode on a carbon support, a metal containing anode material, a porous separator, and an electrolyte comprising an aprotic solvent and a conducting salt.

The SEI layer may be sequestered as nanoparticles on a carbon support to provide a substrate. The carbon support also provides a high surface area to assist in air contact with the cathode. The carbon support material may be a carbon material that does not interfere with the operation of the device. Illustrative carbon supports include, but are not limited to, synthetic graphite, natural graphite, expanded graphite, graphene, graphene oxide, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. Commercial examples of carbon black include, but are not limited to, TIMCAL Super C45®, Super-P®, Black Pearls® 2000, Denka Black®, Vulcan® XC72R, and Ketjen Black®. In any of the embodiments, the carbon support may be a carbon fiber support and/or a carbon fiber paper.

The SEI layer includes reduction and oxidation products of electrolytes formed through the reactions between electrode and electrolytes. The SEI includes organic and inorganic domains. The organic domains may include, but are not limited to, reduction products of polyolefins, lithium alkoxides, sodium alkoxides, or a mixture of any two or more thereof. The inorganic domains may include, but not limited to, reduction products from $Na_2O$, $Na_2O_2$, NaOH, NaF, $Na_2CO_3$, $NaHCO_3$, $Na_2S$, $Li_2O$, $Li_2O_2$, LiOH, LiF, $Li_2CO_3$, $LiHCO_3$, $Li_3N$, $Li_2S$, oligomeric borates, glass borates, or a mixture of any two or more thereof. In some embodiments, the SEI layer includes a multi-domain structure. In some embodiments, the SEI has both organic and inorganic domains. For example, the organic domains may include reduction products of polyolefins, sodium alkoxides, lithium alkoxides, or a mixture of any two or more thereof. Additionally, the inorganic domains may include reduction products of one or more of $Na_2O$, $Na_2O_2$, NaOH, NaF, $Na_2CO_3$, $NaHCO_3$, $Na_2S$, $Li_2O$, $Li_2O_2$, LiOH, LiF, $Li_2CO_3$, $LiHCO_3$, $Li_3N$, $Li_2S$, oligomeric and glass borates, or a mixture of any two or more thereof. In some embodiments, the inorganic domains include the reduction products of $Li_2O$, LiF, $Li_2CO_3$, and $LiHCO_3$, $Na_2O$, NaF, $Na_2CO_3$, and $NaHCO_3$.

As noted, the SEI layer may be a multi-domain structure. Accordingly, the average thickness of a domain in the SEI layer may be from about, 1 nm to about 5 µm. This includes from about 1 nm to about 1 µm thick, or about 1 nm to about 500 nm thick. In any embodiment herein, each domain may independently have an average diameter from about 1 nm to about 200 nm, including from about 2 nm o about 200 nm.

The electrochemical device may include a cathode containing an electroactive material including $LO_2$ or $L_2O_2$, $L_2O_2 \cdot xH_2O$ wherein each L is independently selected from Li, Na, K, Be, Mg, Ca, and Al; x ranges from 1 to 8; and the electroactive material is substantially free of transition metal catalyst.

In some embodiments, the anode comprises a lithium foil, lithium mesh, lithium nanoparticles, lithiated carbon, lithiated tin, lithiated silicon, a sodium foil, sodium mesh, sodium nanoparticles, sodiated carbon, sodiated tin, sodiated silicon, a potassium foil, potassium mesh, potassium nanoparticles, potassiated carbon, potassiated tin, potassiated silicon, a magnesium foil, magnesium ribbon, magnesium mesh, magnesium nanoparticles, magnesiated carbon, magnesiated tin, magnesiated silicon, a zinc foil, a zinc ribbon, zinc mesh, zinc nanoparticles, zincated carbon, zincated, tin, zincated silicon, or a combination thereof. In some embodiments, the anode comprises a lithium foil, lithium mesh, lithium nanoparticles, lithiated carbon, lithiated tin, or lithiated silicon. In other embodiments, the anode comprises a lithium foil, lithium mesh, lithium nanoparticles, or a combination thereof. In other embodiments, the anode includes one or more of lithium metal, lithiated carbon, lithiated silicon, lithiated sulfur, lithiated phosphorous, lithiated phosphorene, LiM alloy (where M stands for Na, Al, Bi, Cd, Mg, Sn, and Sb), lithium titanium oxide, sodium metal, sodiated carbon, sodiated silicon, sodiated sulfur, sodiated phosphorous, sodiated phosphorene, NaM alloy (where M stands for Li, Al, Bi, Cd, Mg, Sn, and Sb), sodium titanium oxide, or a combination of any two or more thereof. The electrochemical device may be discharged to about 0.1 V to about 1.3 V, or charged to about 1.3 V to about 4.0 V. The electrochemical device may be discharged at a current density of about 50 µA to about 500 µA, about 100 µA to about 300 µA, or of about 200 µA to about 300 µA.

In some embodiments, the anode may comprise a current collector, a conductive carbon material, a binder, or any combination thereof.

In some embodiments, the cathode comprises a current collector, a conductive lithium or sodium host material, a binder-free material, or any combination thereof.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

When used, the binder may be present in either or both electrodes in an amount of from about 0.1 wt % to about 99 wt %, wherein the amount in each electrode is selected independently of the amount in the other electrode. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

In some embodiments, the separator comprises a microporous or modified polymer separator. Illustrative separators include, but are not limited to, Celgard® 2325, Celgard® 2400, Celgard® 3501, and glass fiber separators.

In some embodiments, the electrolytes include an aprotic solvent and a salt. Illustrative aprotic solvents include non-fluorinated ether-based, fluorinated ether-based, and oligo(ethylene oxide) solvents. Illustrative solvents include, but are not limited to, glyme, diglyme, tetrahydrofuran, tetraethylene glycol dimethylether, (tri (ethylene glycol)-substituted methyl)trimethyl silane (1NM3), ethylene glycol-substituted methyltrimethyl silane (1NM1), and di(ethylene glycol)-substituted methyltrimethyl silane (1NM2). Other illustrative solvents include, but are not limited to, solvents such as acetonitrile (ACN), dimethyl sulfoxide (DMSO), dimethylformamide (DMF), triethyl phosphate, N,N-dimethylacetamide (DMA), N-methyl pyrrolidone (NMP), methoxybenzene, and ionic liquids. In some embodiments, carbonate solvents are absent from the electrolyte. In other embodiments, the solvent includes dimethoxyethane (DME), diethylene glycol dimethyl ether (DEGDME), triethylene glycol dimethyl ether, tetraethylene glycol dimethyl ether, ethylene carbonate (EC), dimethylcarbonate (DMC), diethylcarbonate (DEC), propylene carbonate (PC), dioloxane, γ-butyrolactone, δ-butyrolactone, N-alkylpyrrolidone, fluorinated ethers, fluorinated esters, fluoroethylene carbonate, adiponitrile, (ethylene glycol)methyltrimethyl silane (1NM1), di(ethylene glycol)methyltrimethyl silane (1NM2), tri(ethylene glycol)methyltrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, an ionic liquid, or a mixture of any two or more thereof.

The (tri (ethylene glycol)-substituted methyl)trimethyl silane may be a compound of formula:

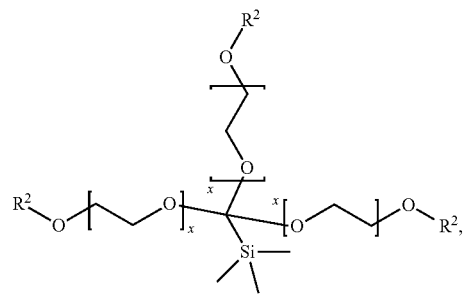

wherein each $R^2$ is independently $C_1$-$C_5$ alkyl; 4-10 membered heterocyclyl $C_1$-$C_4$ alkyl($C_1$-$C_4$)alkoxy, $C_1$-$C_4$ haloalkyl, halo, and $C_1$-$C_4$ alkylester; 5-10 membered heteroaryl; 6-10 membered aryl; or 4-7 membered cycloalkyl; and each x is independently 1-10.

In some embodiments the ethylene glycol-substituted methyltrimethyl silane is of the structure:

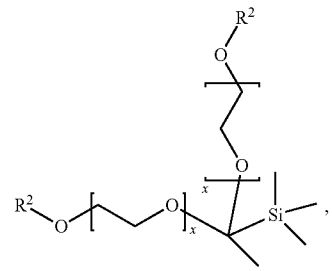

wherein each $R^2$ is independently $C_1$-$C_5$ alkyl; 4-10 membered heterocyclyl $C_1$-$C_4$ alkyl($C_1$-$C_4$)alkoxy, $C_1$-$C_4$ haloalkyl, halo, and $C_1$-$C_4$ alkylester; 5-10 membered heteroaryl; 6-10 membered aryl; or 4-7 membered cycloalkyl; and each x is independently 1-10.

The salt may be a lithium salt, a sodium salt, an ammonium salt, or a mixture of any two or more thereof. Illustrative lithium salts for use in the electrolytes include, but are not limited to, lithium salts such as $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$, lithium alkyl fluorophosphates, $Li(C_2O_4)_2$, $LiBF_2C_2O_4$, $Li_2B_{12}X_{12}$-pHp, $Li_2B_{10}X_{10}$-yHy, or a mixture of any two or more lithium salts, wherein X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10. Illustrative sodium salts for use in the electrolytes include, but are not limited to, sodium salts such as $NaCF_3CO_2$, $NaC_2F_5CO_2$, $NaClO_4$, $NaBF_4$, $NaAsF_6$, $NaPF_6$, $NaPF_2(C_2O_4)_2$, $NaPF_4C_2O_4$, $NaCF_3SO_3$, $NaN(CF_3SO_2)_2$, $NaC(CF_3SO_2)_3$, $NaN(SO_2C_2F_5)_2$, sodium alkyl fluorophosphates, $Na(C_2O_4)_2$, $NaBF_2C_2O_4$, $Na_2B_{12}X_{12}$-pHp, $Na_2B_{10}X_{10}$-yHy, or a mixture of any two or more sodium salts, wherein X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10. The salt, or mixture of salts, may be present in the electrolyte from about 0.01 M to about 10 M. This includes from about 0.1 M to about 5 M, from about 0.1 M to about 3 M, from about 0.5 M to about 5 M, or from about 0.5 M to 2.5 M.

The present technology, thus generally described, will be understood more readily by reference to the following examples, which are provided by way of illustration and are not intended to be limiting of the present invention.

EXAMPLES

Figure 2:
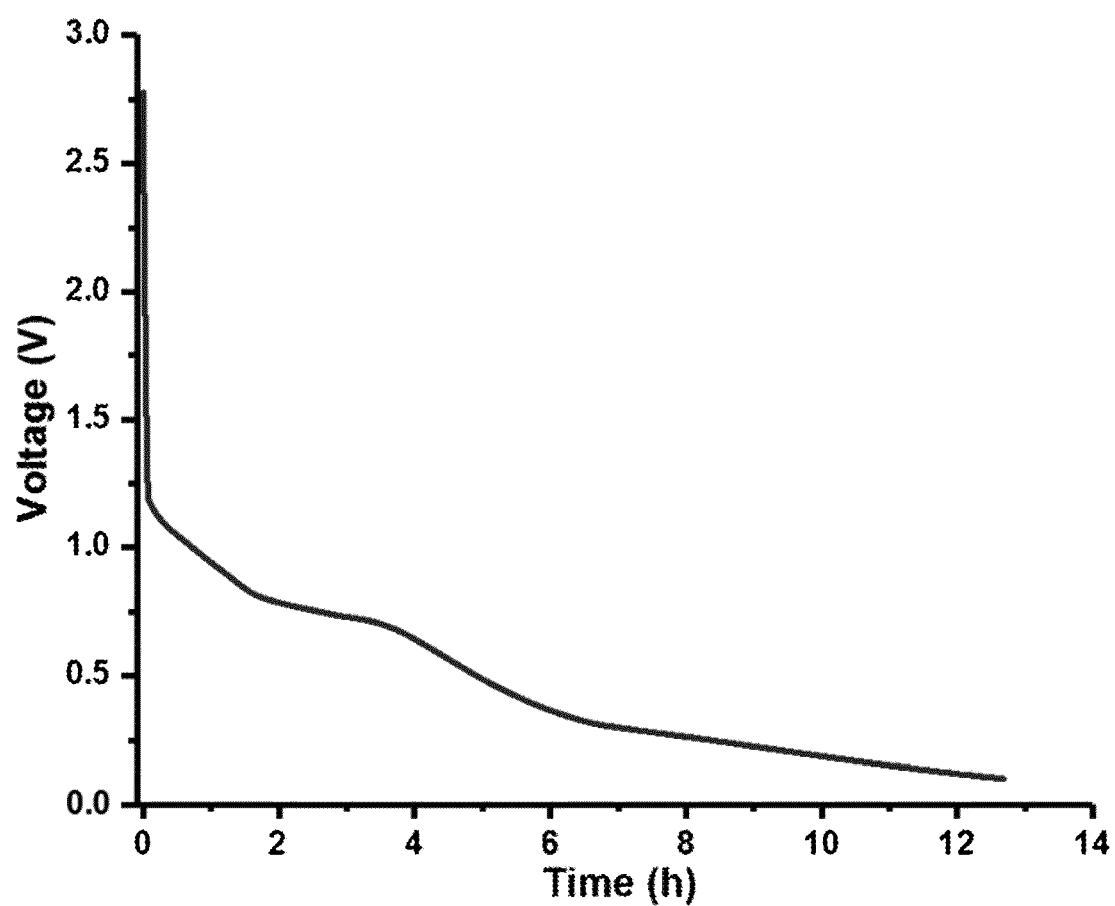
FIG. 2 is a typical discharge profile of carbon fiber paper at a current of 250 µA.
Figures 3A, 3B:
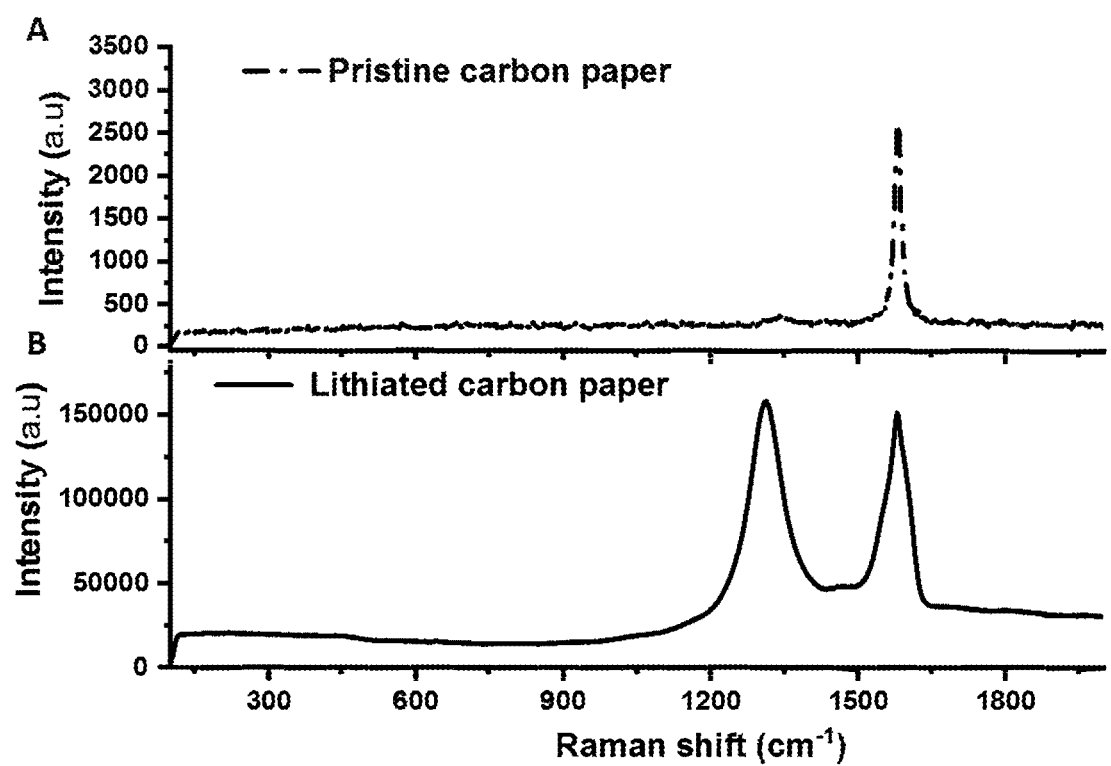
FIGS. 3A and 3B are Raman spectra for pristine carbon fiber paper (FIG. 3A) and lithiated carbon fiber paper (FIG. 3B) at a current of 250 µA, according to the examples.

Example 1: Formation of an SEI on a carbon support as an air cathode. The SEI is formed via a lithiation process. The lithiation process uses a Swagelok cell with a lithium metal anode, commercial carbon fiber paper cathode, and 1 M lithium trifluoromethanesulfonate (LiOTf) in tetraethylene glycol dimethyl ether (TEDGME). To form the SEI, the cell was discharged to 0.1 V at a current density of 250 µA. The discharge curve (see FIG. 2) showed a plateau around 0.7 V indicating the formation of the SEI. After filling the glass chamber with pure $O_2$, the discharged carbon fiber paper with SEI layer acts as a cathode directly in lithium oxygen batteries without any other materials (binder or catalyst) and operations being required. Application of this carbon fiber paper exhibits excellent capacity, efficiency, and improved stability. FIGS. 1A, 1B, 1C, and 1D are scanning electron microscope (SEM) images of pristine carbon fiber paper (FIGS. 1A and 1B) and lithiated carbon fiber paper (FIGS. 1C and 1D). FIGS. 3A and 3B are Raman spectra for pristine carbon fiber paper (FIG. 3A) and lithiated carbon fiber paper (FIG. 3B), according to the examples, at a current of 250 µA. The advantage of this electrochemical method is that the synthesis of the SEI is independent of the discharge current. This allows tailoring of the thickness, distribution, and composition of the SEI prior to introduction onto the carbon support.

Example 2: Preparation of an electrochemical cell. Swagelok-type cells with a cathode having carbon fiber paper and an SEI layer, from Example 1, were tested under a 1 bar $O_2$ atmosphere with a battery and cell tester (MACCOR cycler). Tetraethylene glycol dimethylether (TEGDME) with 1 M $LiCF_3SO_3$ was selected as the electrolyte.

For comparison, control cells were also prepared containing an untreated carbon fiber paper cathode. The control cells were tested under similar conditions, with the specific capacities normalized to the loading of the cathode material.

Figure 4A:
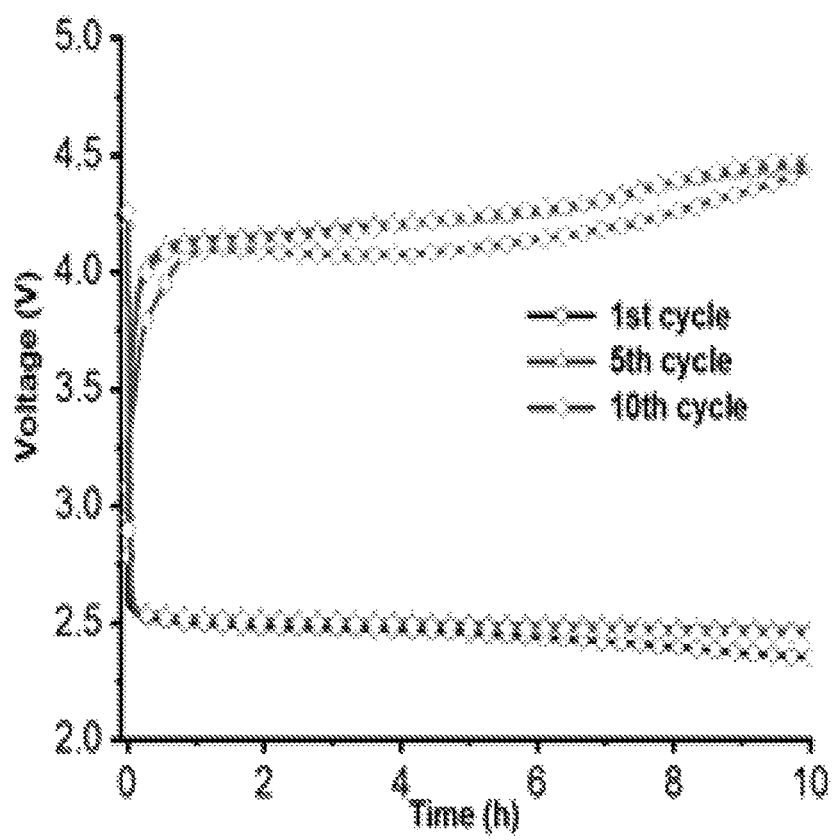
FIGS. 4A and 4B are voltage profiles for pristine carbon fiber paper (FIG. 4A) and lithiated carbon fiber paper (FIG. 4B) at a current of 250 µA, according to the examples.
Figure 4B:
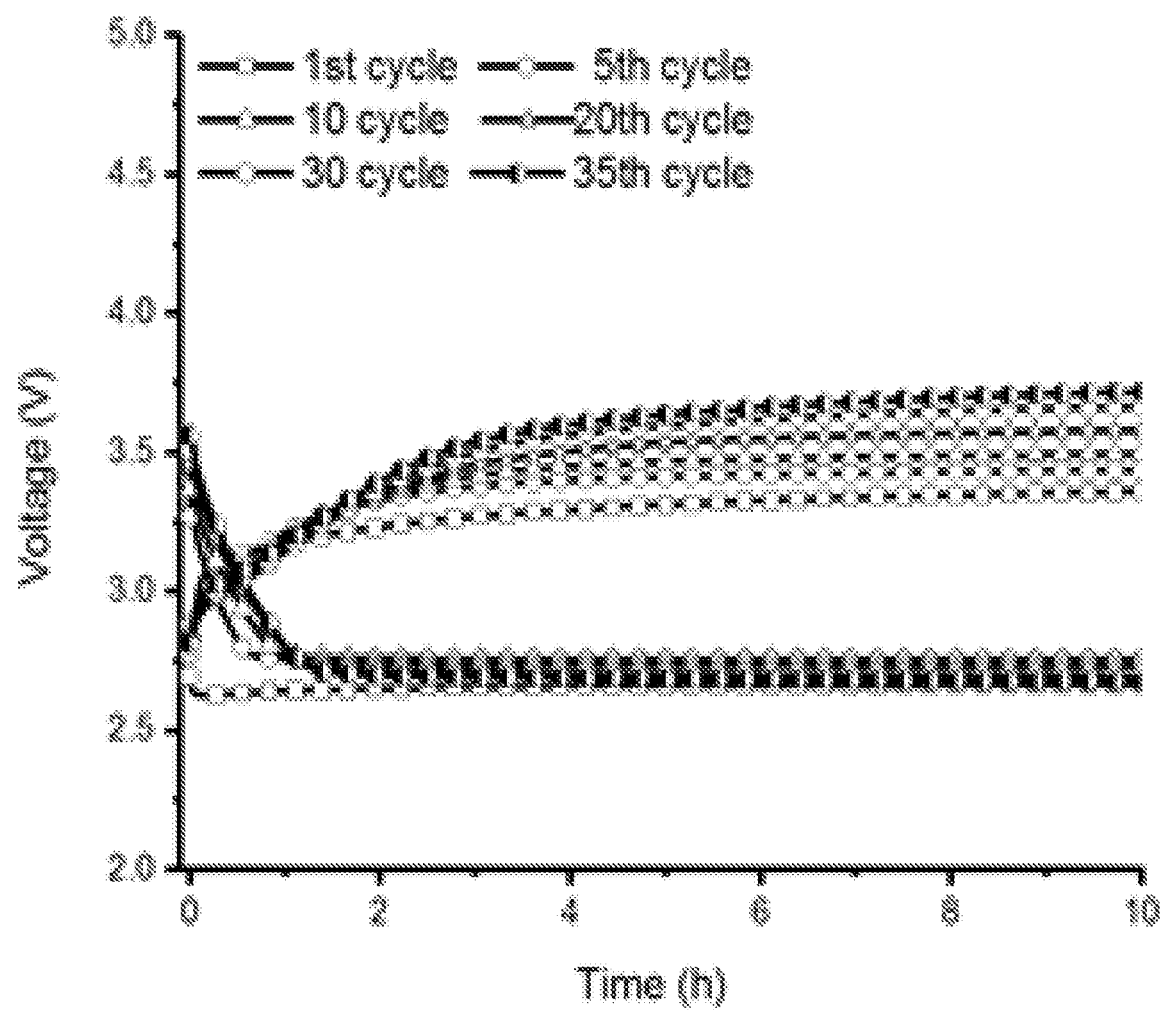
Figure 5A:
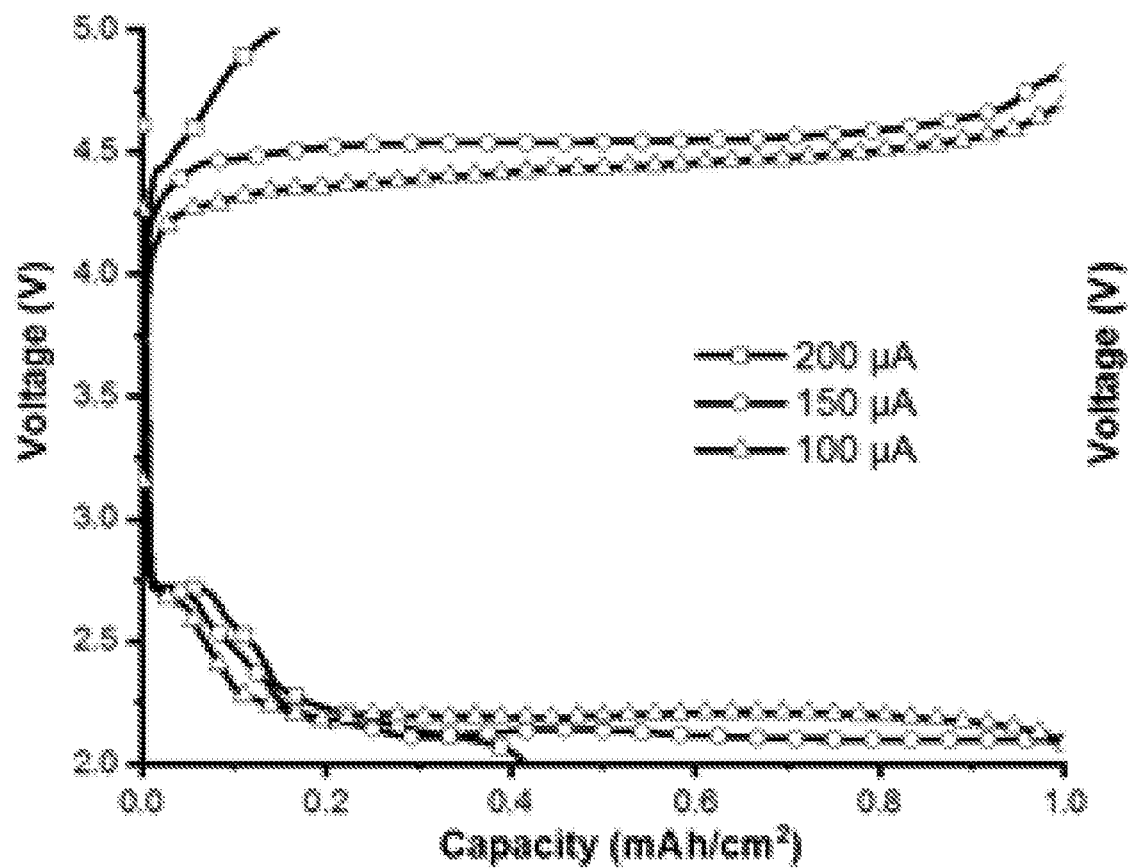
FIGS. 5A and 5B are voltage profiles for pristine carbon fiber paper (FIG. 5A) and lithiated carbon fiber paper (FIG. 5B) in a lithium oxygen battery at different rates, according to the examples.
Figure 5B:
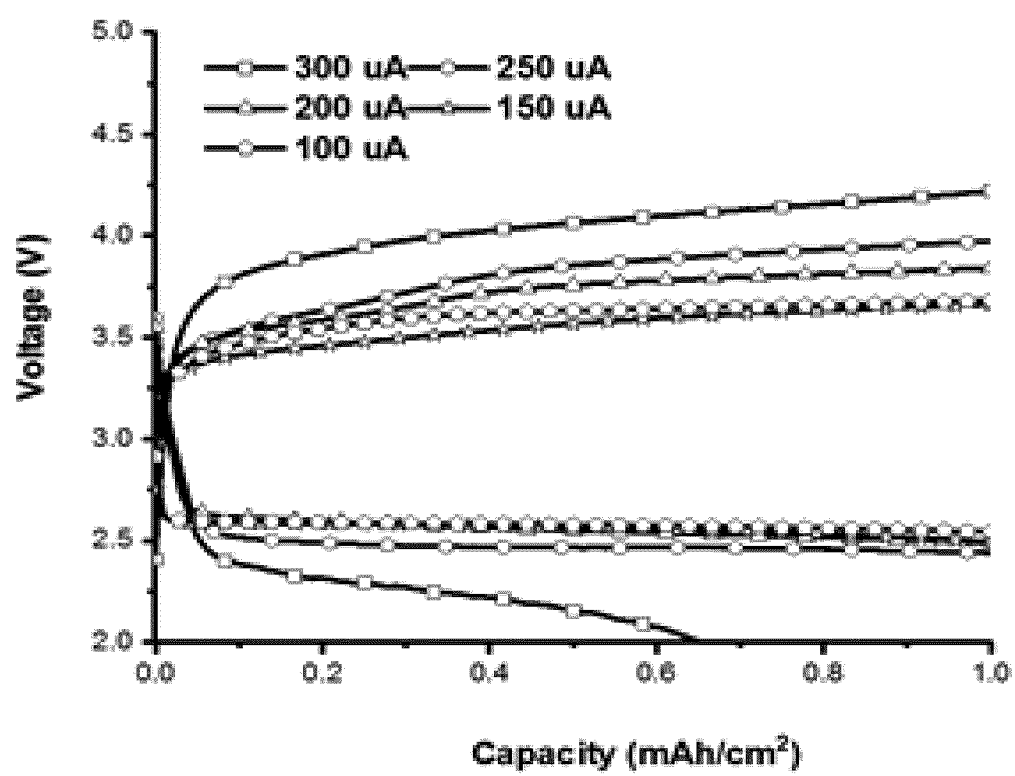
Figure 6:
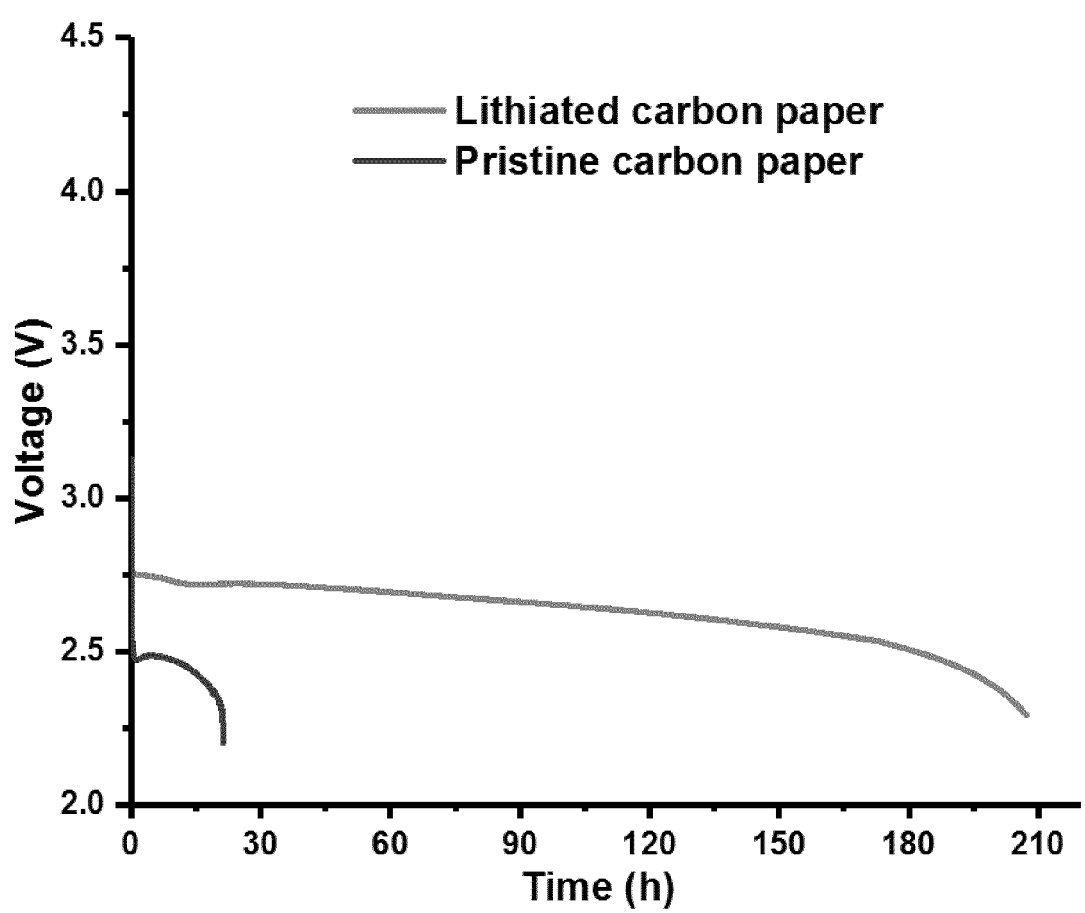
FIG. 6 illustrates the maximum capacity of a pristine carbon fiber paper cathode and a lithiated carbon fiber paper cathode in lithium-oxygen batteries with cut-off voltage 2.2 V, according to the examples.

FIG. 4 shows voltage profiles of the different cells after the first discharge to 2.2 V. The discharge reaction of all the tested cells takes place in the range of 2.65-2.70 V, with the total specific capacity around 2,000 mAh/g. The lithiated cathode (SEI cathode) had the highest discharge capacity, showing a substantial improvement of the discharge specific capacity over the control cells. FIG. 5 shows the voltage profiles of the pristine carbon fiber paper cathode and the lithiated carbon fiber paper cathode (SEI cathode) in lithium oxygen batteries at different rates. The lithiated cathode has the better tolerance towards current, showing a substantial improvement of the rate performance. FIG. 6 shows the maximum capacity of the pristine carbon fiber paper cathode and the lithiated carbon fiber paper cathode (SEI cathode) in lithium oxygen batteries with a cut-off voltage 2.2 V. The lithiated cathode has a higher maximum capacity, showing a substantial improvement of the discharge specific capacity over the control cells.

Differences are also observed in discharge products that were analyzed by x-ray diffraction (XRD) and scanning electron microscopy (SEM). The diffraction patterns of the discharged cathodes clearly showed that $Li_2O_2$ is the main discharge product. A small amount of LiOH was also detected on the samples, which is likely due to hydrolysis of $Li_2O_2$ from water either remaining on the electrode, condensing from the air during the XRD measurements, or from decomposition of the electrolyte.

Consistent with the XRD patterns, a toroid of $Li_2O_2$ is observed in the SEM images for all the discharged cathodes, as shown in FIG. 7. However, according to the SEM images, a larger sized $Li_2O_2$ toroid is produced with the SEI enabled cathode than in untreated carbon fiber. These results indicate that the crystallization of $Li_2O_2$ benefits from the lithiated carbon fiber paper.

Figure 8A:
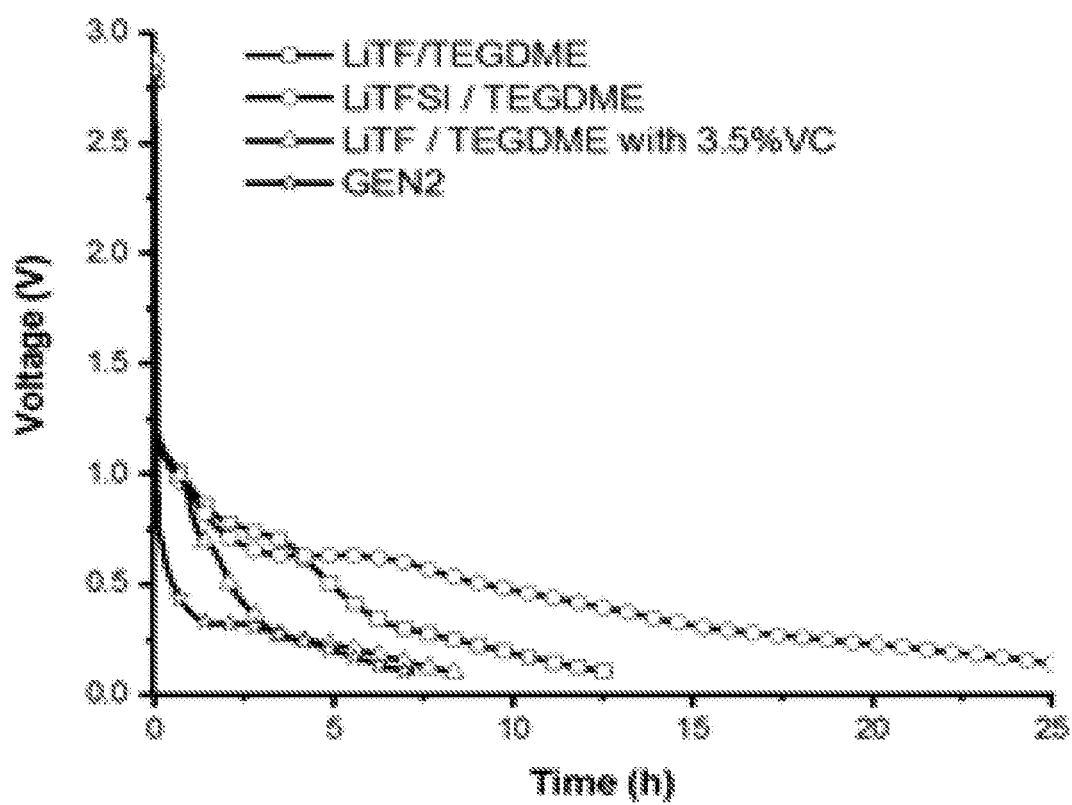
FIG. 8A illustrates the lithiation profile of carbon fiber paper using different electrolytes.
Figure 8B:
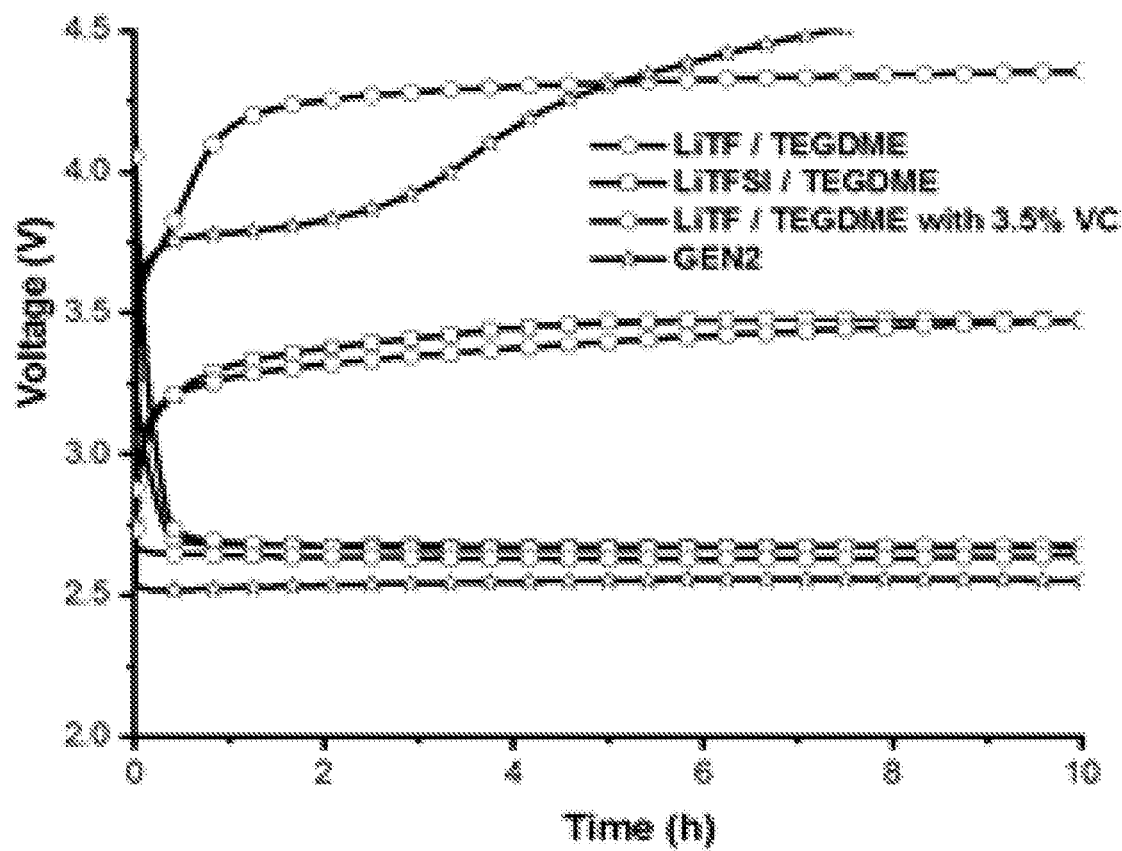
FIG. 8B illustrates the first cycle performance of the as-prepared lithiated carbon fiber paper in lithium-oxygen batteries, according to the examples.
Figure 9A:
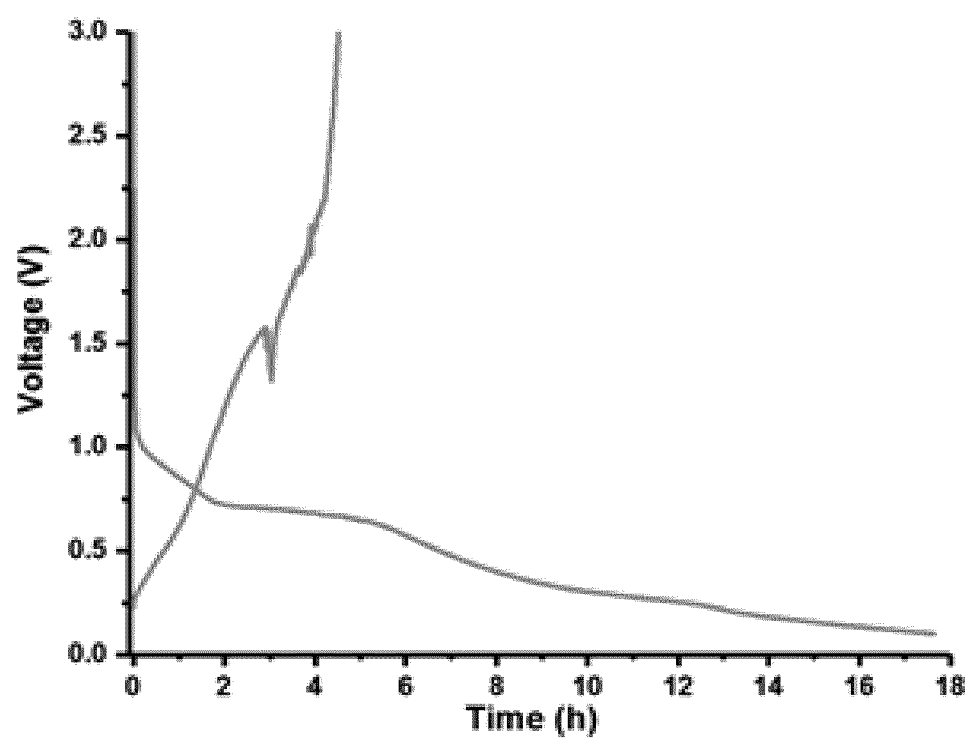
FIG. 9A illustrates the first discharge-charge profile of carbon fiber under argon.
Figure 9B:
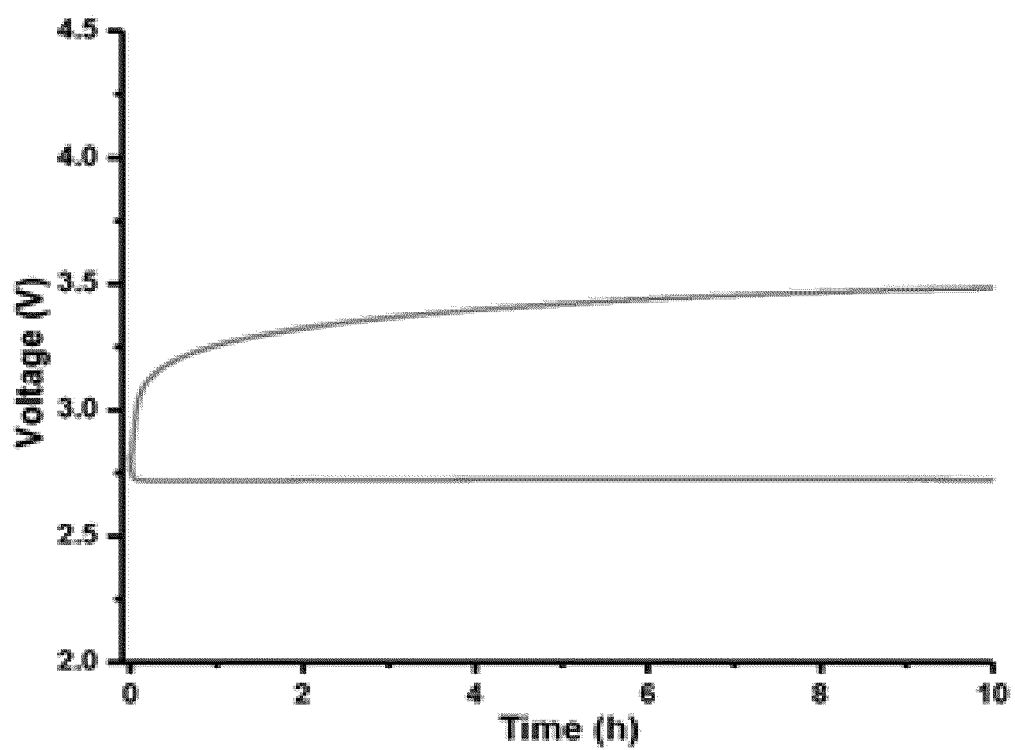
FIG. 9B illustrates the performance of the carbon fiber paper in a lithium-oxygen battery after one cycle under argon, according to the examples.

FIG. 8A illustrates the lithiation profile of carbon fiber paper using different electrolytes, and FIG. 8B illustrates the first cycle performance of the as-prepared lithiated carbon fiber paper in lithium-oxygen batteries, according to Example 1. FIG. 9A illustrates the first discharge-charge profile of carbon fiber under argon, and FIG. 9B illustrates the performance of the carbon fiber paper in a lithium-oxygen battery after one cycle under argon, according to the present Examples.

Figure 10A:
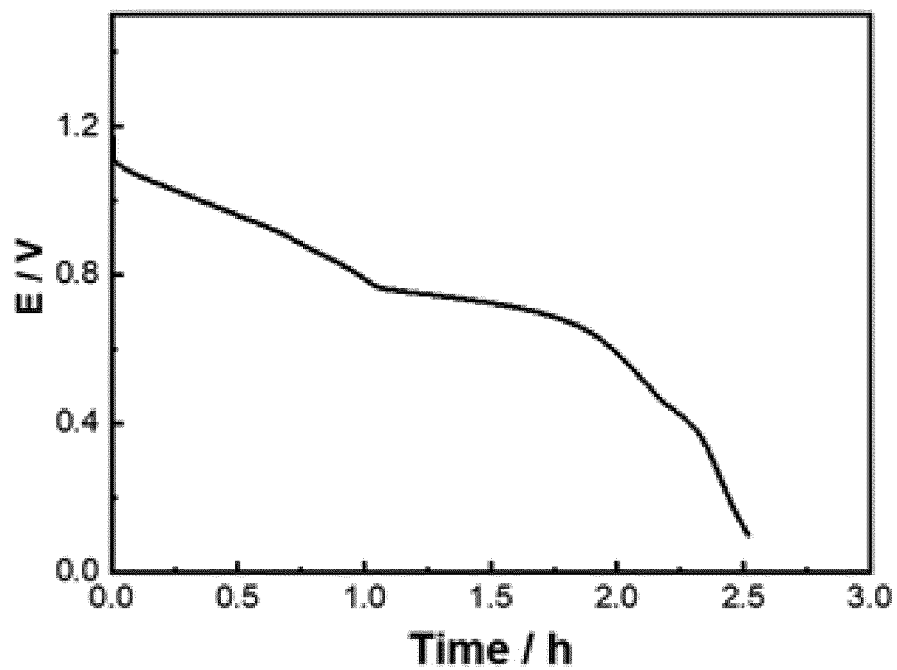
FIG. 10A is a discharge profile of a Na/carbon coin cell to form an SEI on the carbon fiber paper, at a current of 150 µA.
Figure 10B:
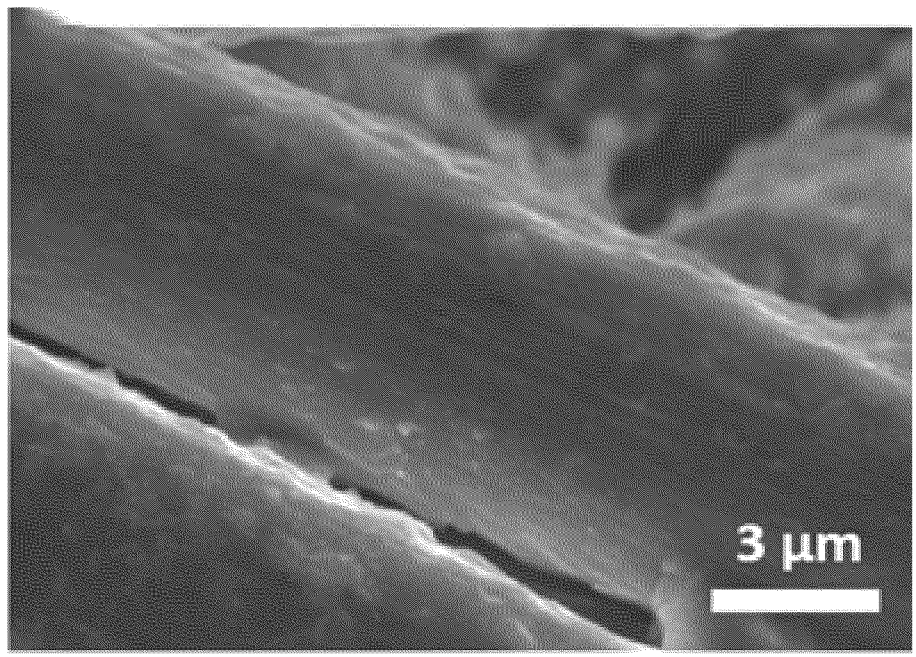
FIG. 10B is the SEM image of the SEI coated carbon fiber paper formed in the Na-ion cell, according to the examples.

Example 3: The formation of an SEI on a carbon support as an air cathode for sodium oxygen battery is similar to Example 1. The SEI is formed via the discharging process of a sodium/carbon cell. This process uses a Swagelok cell with a sodium metal anode, commercial carbon fiber paper cathode, and 1 M sodium trifluoromethanesulfonate (NaOTf) in tetraethylene glycol dimethyl ether (TEDGME). To form the SEI, the cell was discharged to 0.1 V at a current density of 150 µA. The discharge curve (see FIG. 10A) exhibits a plateau at about 0.7 V indicating the formation of the SEI. FIG. 10B is the SEM image of the as-prepared SEI/Carbon cathode in the sodium battery.

After filling the glass chamber with pure $O_2$, the discharged carbon fiber paper with SEI layer acts as a cathode directly in sodium oxygen batteries without any other materials (binder or catalyst) and operations being required. The sodium oxygen battery were assembled by using sodium metal as the anode, the SEI/Carbon cathode, and a glass fiber separator, with 1 M NaOTf in TEGDME electrolyte. The operation pressure of $O_2$ was about 1 bar and current density is 50 $\mu A \cdot cm^{-2}$. For comparison, control cells were also prepared containing an untreated carbon fiber paper cathode.

Figure 11A:
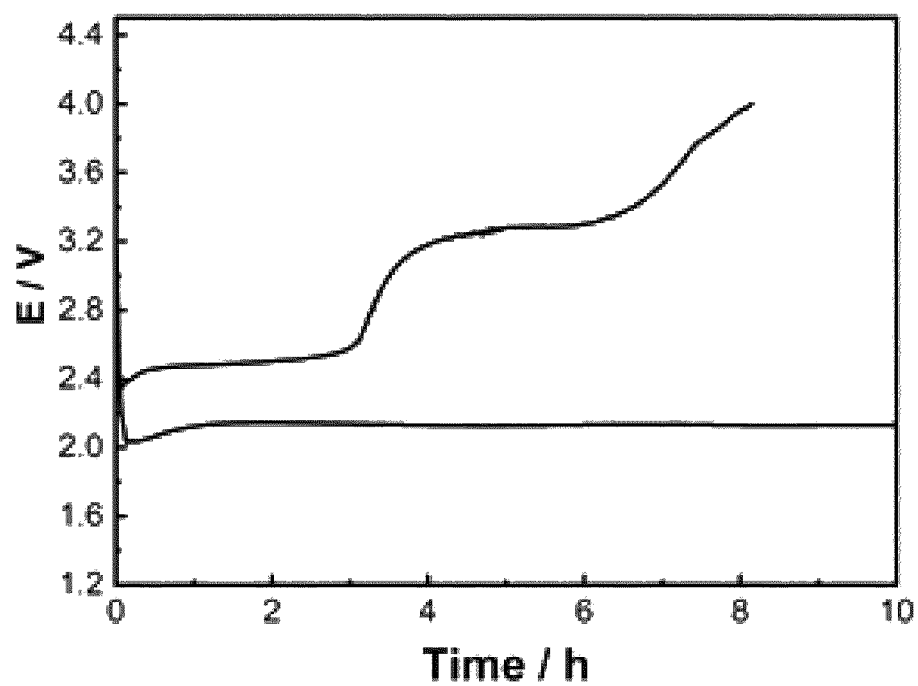
FIGS. 11A and 11B are the voltage profiles of sodium oxygen batteries based on pristine carbon fiber paper (FIG.
Figure 11B:
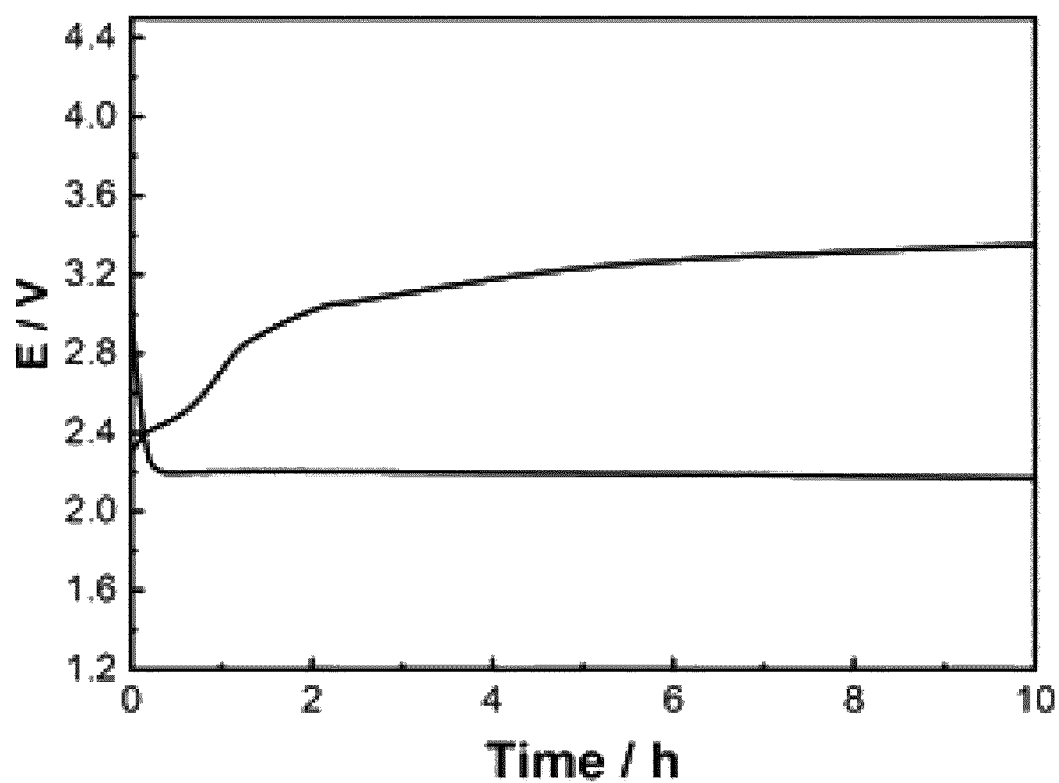

FIG. 11A shows the voltage profiles of the untreated carbon fiber paper cathode and FIG. 11B shows the voltage profiles of the SEI formed carbon cathode. The SEI/carbon based sodium oxygen battery shows a higher discharge voltage than the untreated carbon, showing a better catalytic performance. Moreover, the round-trip efficiency of SEI/carbon cathode reaches 100%, which is much higher than the untreated carbon cathode with a round-trip efficiency of 80%. SEI/carbon cathode shows lower charge voltage than the untreated carbon cathode during most charging process, generating a higher energy efficiency.

Example 4: The formation of an SEI on a carbon support as an air cathode for sodium air battery is the same as Example 3. A sodium air battery was assembled using sodium metal as the anode, an SEI/carbon cathode, and a glass fiber separator, with 1 M NaOTf in TEGDME electrolyte. An air atmosphere was used as the cathode source. Air contains multiple gas components such as $N_2$, $O_2$, $H_2O$, $CO_2$, Ar, and other minor components. The operation pressure of air was about 1 bar and current density is 50 $\mu A \cdot cm^{-2}$. For comparison, control cells were also prepared containing an untreated carbon fiber paper cathode.

FIG. 12A shows the voltage profiles of the untreated carbon fiber paper cathode in air and FIG. 12B shows the voltage profiles of the SEI formed carbon cathode in air. The SEI/carbon based sodium air battery shows a higher discharge voltage than the untreated carbon, showing a better catalytic performance, similar to the scenario of sodium oxygen battery. More importantly, the SEI/carbon cathode shows a much lower charging voltage (3.1 V) compared to the untreated carbon cathode (4.2 V) in air atmosphere.

While certain embodiments have been illustrated and described, it should be understood that changes and modifications could be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical device comprising:
    an air cathode comprising a solid electrolyte interphase (SEI) on a lithiated carbon support;
    a metal-containing anode;
    a porous separator; and
    an electrolyte comprising an aprotic solvent
    wherein the SEI comprises inorganic domains of $Na_2O_2$ or $Li_2O_2$ having a toroidal morphology.

2. The electrochemical device of claim 1, wherein the SEI is about 1 nm to about 1 μm thick.

3. The electrochemical device of claim 1, wherein the SEI comprises domains with an average diameter of about 1 nm to about 200 nm.

4. The electrochemical device of claim 1, wherein the metal-containing anode comprises one or more of lithium metal, lithiated carbon, lithiated silicon, lithiated sulfur, lithiated phosphorous, lithiated phosphorene, LiM alloy (where M stands for Na, Al, Bi, Cd, Mg, Sn, and Sb), lithium titanium oxide, sodium metal, sodiated carbon, sodiated silicon, sodiated sulfur, sodiated phosphorous, sodiated phosphorene, NaM alloy (where M stands for Li, Al, Bi, Cd, Mg, Sn, and Sb), sodium titanium oxide, or a combination of any two or more thereof.

5. The electrochemical device of claim 1, wherein the aprotic solvent is selected from the group consisting of a non-fluorinated ether-based solvent, a fluorinated ether-based solvent, an oligo (ethylene oxide) solvent, and a mixture of any two or more thereof;
    wherein the aprotic solvent is free of carbonates.

6. The electrochemical device of claim 1, wherein the metal-containing anode comprises lithium metal.

7. The electrochemical device of claim 1, wherein the aprotic solvent is selected from the group consisting of: glyme, diglyme, tetrahydrofuran, tetraethylene glycol dimethylether, tri(ethylene glycol)-substituted methyltrimethyl silane, ethylene glycol-substituted methyltrimethyl silane, di(ethylene glycol)-substituted methyltrimethyl silane, acetonitrile, dimethyl sulfoxide, dimethylformamide, triethyl phosphate, N,N-dimethylacetamide, N-methylpyrrolidone, methoxybenzene, an ionic liquid, and a mixture of any two or more thereof.

8. The electrochemical device of claim 1, wherein the electrolyte further comprises a lithium or sodium salt.

9. The electrochemical device of claim 1, wherein the carbon support comprises synthetic graphite, natural graphite, amorphous carbon, hard carbon, soft carbon, acetylene black, mesocarbon microbeads (MCMB), carbon black, mesoporous carbon, porous carbon matrix, carbon nanotube, carbon nanofiber, graphene, graphene oxide, reduced graphene oxide, or a mixture of any two or more thereof.

10. The electrochemical device of claim 1, comprising an over-potential of about 0.2-0.7 V.

11. A method of making an air cathode, the method comprising:
    discharging or charging an electrochemical device comprising an air cathode comprising a carbon support, a metal-containing anode, a porous separator, and an electrolyte comprising a salt and an aprotic solvent to form a solid electrolyte interphase (SEI) on the carbon support wherein the SEI comprises inorganic domains of $Na_2O_2$ or $Li_2O_2$ having a toroidal morphology.

12. The method of claim 11, wherein the discharging or charging is conducted under an argon atmosphere.

13. The method of claim 11, wherein the salt is a lithium salt, a sodium salt, an ammonium salt, or a mixture of any two or more thereof.

14. The method of claim 11, wherein the salt is lithium trifluoromethanesulfonate, sodium trifluoromethanesulfonate, or a mixture thereof, and the solvent comprises tetraethylene glycol dimethyl ether.

15. The method of claim 11, wherein the electrochemical device is discharged to about 0.1 V to about 1.3 V, or charged from about 1.3 V to about 4.0 V.

16. The method of claim 15, wherein the electrochemical device is discharged or charged at a current density of about 50 µA to about 500 µA.

17. The method of claim 11, wherein the metal-containing anode comprises one or more of lithium metal, lithiated carbon, lithiated silicon, lithiated sulfur, lithiated phosphorous, lithiated phosphorene, LiM alloy (where M stands for Na, Al, Bi, Cd, Mg, Sn, and Sb), lithium titanium oxide, sodium metal, sodiated carbon, sodiated silicon, sodiated sulfur, sodiated phosphorous, sodiated phosphorene, NaM alloy (where M stands for Li, Al, Bi, Cd, Mg, Sn, and Sb), sodium titanium oxide, or a combination of any two or more thereof.

18. The method of claim 11, wherein the solvent comprises dimethoxyethane (DME), diethylene glycol dimethyl ether (DEGDME), triethylene glycol dimethyl ether, tetraethylene glycol dimethyl ether (TEGDME), ethylene carbonate (EC), dimethylcarbonate (DMC), diethylcarbonate (DEC), propylene carbonate (PC), dioloxane, γ-butyrolactone, δ-butyrolactone, N-alkylpyrrolidone, fluorinated ethers, fluorinated esters, fluoroethylene carbonate, adiponitrile, (ethylene glycol)methyltrimethyl silane (1NM1), di(ethylene glycol)methyltrimethyl silane (1NM2), tri(ethylene glycol)methyltrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, an ionic liquid, or a mixture of any two or more thereof.

\* \* \* \* \*